Figure 1:
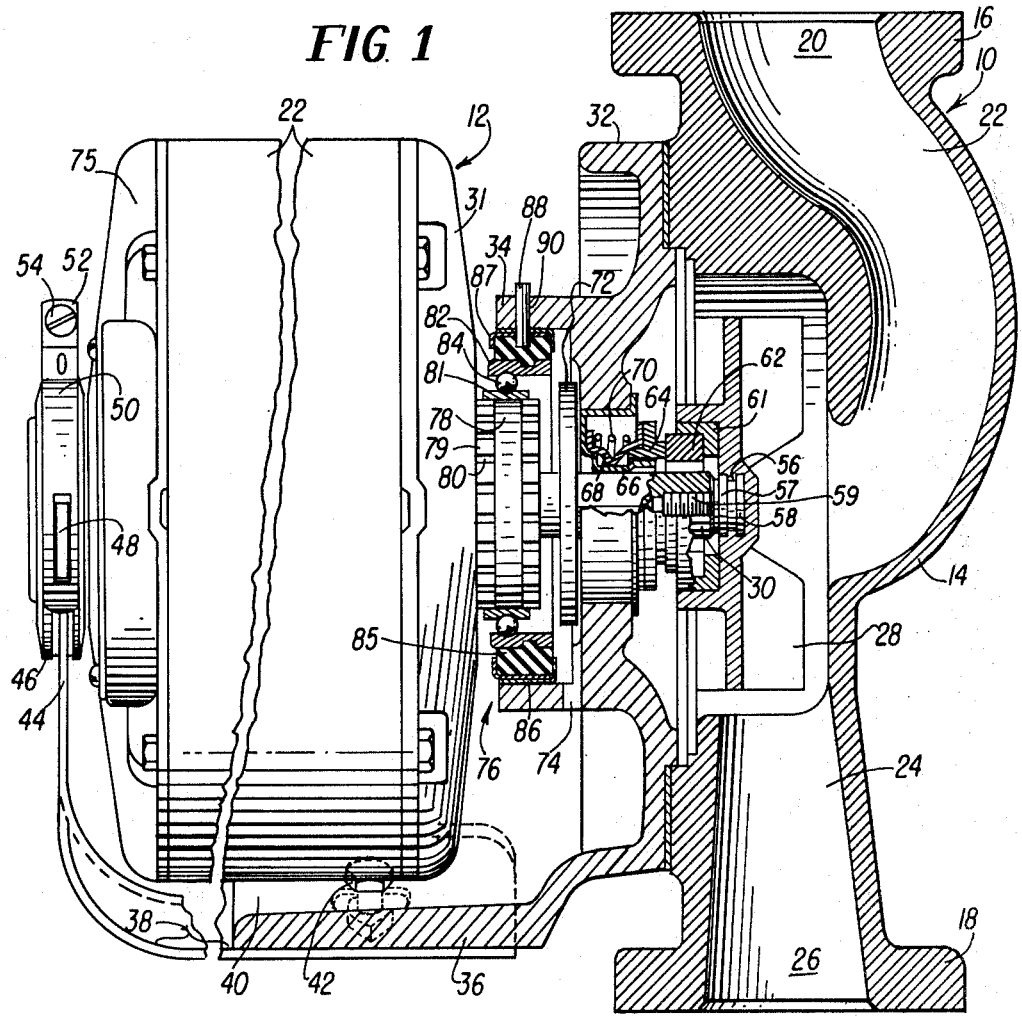

May 25, 1965 H. SPRING 3,185,099
MOTOR MOUNTING ARRANGEMENT FOR LIQUID CIRCULATOR
Filed March 18, 1963

INVENTOR.
HANS SPRING
BY
*Bair, Freeman & Molinare*
ATTYS.

United States Patent Office 3,185,099
Patented May 25, 1965

3,185,099
MOTOR MOUNTING ARRANGEMENT FOR
LIQUID CIRCULATOR
Hans Spring, Reading, Mass., assignor to Watts Regulator
Company, a corporation of Massachusetts
Filed Mar. 18, 1963, Ser. No. 265,684
4 Claims. (Cl. 103—87)

This invention relates to a liquid circulator and, more particularly, to a liquid circulator having improved, durable motor mounting means therein operative to maintain the noise level at a very low level and to fixedly retain the motor against radial and axial movement.

Liquid circulators, such as centrifugal water pumps that may advantageously be used in residental heating and cooling systems, are possessed of the general problem of being maintainable for extended operation at a low noise level. When soft rubber mounting rings have been utilized to support the motor between the close-coupled motor and the impeller of the pump, low noise levels were obtained, but the seal was unreliable. Pumps with hard rubber mounting rings had better seal reliability, but were noisy. As the rubber mounting rings could not economically be molded concentrically, the metal support bands on the rubber ring did not have coinciding centers. Thus, there was eccentricity between the shaft and the seal which resulted in undesirable seal wear. Further, there was a tendency for radial movement of the motor during rotation thereof due to unbalance in the motor rotor, causing vibration. The motor unbalance, coupled with a sagging of the motor caused by drifting of the front resilient mounting ring due to high temperatures adjacent thereto, in some cases reduced to the useful life of the liquid circulator.

During shipment, the liquid circulators are sometimes handled roughly. Because of the resiliency in the rubber mounting ring, the motor can move radially in its mounting when the liquid circulator is dropped. Such radial movement is often enough to damage the seal and break the carbon ring disposed between the pump and the motor in the liquid circulator. This results in leakage when the pump is placed in operation.

Rubber mounting rings are flexible not only in response to radial forces, but also to axial forces, as caused, for example, by appreciable changes in water pressure within the pump housing. It has been found that this axial flexing can reduce the useful life of the circulator.

Another difficulty encountered with rubber mounting rings utilized in liquid circulators between the motor and pump is that they tend to harden with age, particularly when the liquid circulator is used to pump very hot water in heating systems. When the rubber hardens, the torsional vibration of the motor and the sounds generated inside the motor are no longer sufficiently isolated from the pump. Though the problem could be reduced through the selection of special high-temperature rubber compounds, such compounds are expensive and would still possess the disadvantages noted above.

An object of the present invention is to provide an improved liquid circulator wherein the deficiencies and disadvantages of prior constructions are obviated.

Another object of this invention is to provide a liquid circulator having improved motor mounting means between the close-coupled motor and pump.

Yet another object of this invention is to provide improved motor mounting means for a liquid circulator wherein axial and radial movement of the motor are virtually eleminated and whereby liquid circulator longevity is increased and the noise level thereof during operation remain at a very low level.

Still another object of the present invention is to provide a liquid circulator having improved motor mounting means which are better able to withstand rough handling of the liquid circulator during shipment. These and other objects of the present invention will become apparent as the following description proceeds and the features of novelty which characterize this invention will be pointed out with particularity in the claims annexed to and forming part of this specification.

Figure 2:
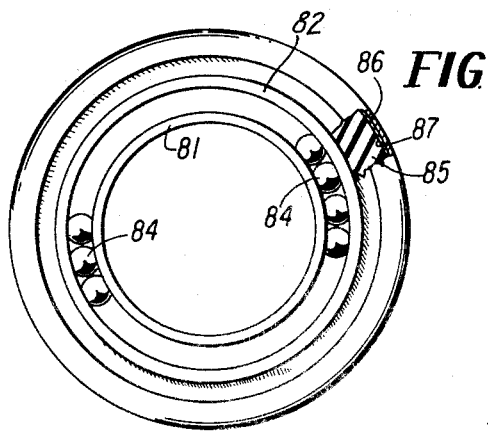

A preferred embodiment of this invention is shown in the accompanying drawing, wherein like numerals refer to like elements, and in which:

FIGURE 1 is a composite view partly in elevation and partly in vertical axial cross-section, and with certain portions shown in axially reduced dimension, of a liquid circulator comprising a close-coupled motor and pump having a motor mounting means constructed in accordance with the present invention; and FIGURE 2 is an elevational view of the improved motor mounting means of the present invention partly in cross-section to more clearly illustrate the manner in which the rubber ring is encapsulated about the outer race of the ballmount in the motor mounting means.

Referring now to the drawings, there is shown in FIGURE 1 a liquid circulator, which includes a pump or impeller means generally indicated at 10 and an electric motor drive means generally indicated at 12. The impeller means 10 includes a hollow casing 14 having an upper mounting flange 16 and a lower mounting flange 18. The upper annular mounting flange 16 surrounds an inlet opening 20 which receives liquid from an inlet pipe and leads to a curved inlet passageway 22 that terminates axially of the centrifugal impeller within the impeller housing. The casing also provides a tangential passageway 24 that leads from the impeller to the outlet opening 26 which is surrounded by the lower annular mounting flange 18 and from whence liquid is discharged to an outlet pipe. A vaned impeller 28 is positioned within the impeller casing 14 and is of the type to receive the water axially from the flow passageway 22 and to direct it tangentially through the flow passageway 24.

The motor drive means 12 is, preferably, an inexpensive shaded pole electric motor that is well known in industry. More specifically, the motor is of the "Form G" type that is manufactured by General Electric Company. This type of motor is widely used in the circulator industry and is of a design wherein the thrust bearings therefor are both located adjacent one end shield, or end plate, of the motor housing.

As shown in FIGURE 1, the motor 12 has a drive shaft 30 which extends outwardly of the motor housing 31 and which is coupled directly to the vaned impeller 28, so that the motor drive means 12 and the liquid circulator 10 are closely coupled. Such an arrangement is in contrast with other installations wherein special couplings are normally interposed between the drive shaft of the motor and the impeller of the pump, and wherein rather large bearing housings may be interposed between the motor and the pump.

Referring now more specifically to the arrangement of parts by means of which there is achieved a close coupling between the motor drive means 12 and the impeller means 10, FIGURE 1 shows that there has been provided a mounting bracket 32 of relatively heavy material having an annular part which is connected by bolts directly to an annular portion of the impeller casing 14 which surrounds the impeller 28. The bracket 32 has a central annular portion 34 and a lower, support portion 36 which extends axially of a portion of the motor drive means 12. A second support bracket 38 is provided of relatively thinner material than bracket 32, and said second bracket 38 has ear portions 40 for connection to the support portion 36 of the bracket 32. Bolt means 42 operate to rigidly secure the ears 40 of adjustable support bracket 38 to the mounting bracket 32.

The extended end of bracket 38 is shaped to define an arcuate portion 44 which cooperates with an exteriorly grooved resilient mounting 46 that is carried by the cassing of the motor drive means 12. The bracket 38 also provides a pair of oppositely extending ears 48 which provide hook or attachment means, upon which to secure a pair of accurate strap members 50 which are recessed for cooperative engagement with the ears 48, and which strap members are of somewhat flexible sheet metal. The upper ends of strap members 50 carry flanges 52 which are spaced to permit of selective clamping under the bias of nut and bolt means 54. The structure thus far described provides support means for the distal end of the motor housing 31.

Turning now to the interconnection of parts at the closely coupled end of motor 12, the impeller 28 is shown as having a hub portion 56 gripped between a pair of spaced flanges 57 and 58 carried on the end of threaded bolt 59 affixed in a correspondingly threaded opening in the motor drive shaft 30. The rear side of impeller 28 is recessed and carries therein an annular, cup-shaped mounting ring 61 within which is positioned a ring 62, the rear end of which abuts a shaped ring 64, which is axally movable on formed sheet metal ring 66. The ring 61 may be made if a molded piece of rubber, and the spacer ring 62 may be made from ceramic or the like, and the ring 64 may be made of carbon. A portion of the ring 66 is made to fit the inner contour of the heavy mounting bracket 32. A bellows type shaft seal 68 is provided, which at one end thereof abuts the ring 64 to press ring 64 against part 62 and at the other end abuts a portion of ring 66. The rubber bellows 68, by means of its turned-out flanges as shown, is bonded at one end to ring 66 and at the other end to ring 64. A coil spring 70 is provided between the turned-out flanges of the shaft seal bellows 68 to press said shaped ring 64 against said ring 62.

Also mounted on shaft 30 is a throwoff disc 72 which operates to throw off any liquid which may seep past the seal hereinabove described. The annular portion 34 of bracket 32 is provided with a plurality of radial apertures 74 through which the thrown-off liquid is discharged. The extended end of annular portion 34 receives therein an improved mounting means 76 that is carried on the casing or housing 31 of motor 12.

The motor is, as previously noted, of the type wherein the thrust bearings are located adjacent one end shield of the device. In the device shown herein the end shield 75 at the distal end of motor 12 is the one adjacent which the thrust bearings are located. The thrust bearings are preferably of the type disclosed in the copending application of Hans Spring, Serial No. 45,030, filed July 25, 1960, now Patent No. 3,071,075, granted January 1, 1963. Included in the thrust bearing construction and located on the outer end thereof is an annular spring which is compressed sufficiently to exert a predetermined axial thrust on the shaft 30 of motor 12 for minimizing end play and axial vibration of the shaft 30.

The improved motor mounting means 76 of this invention comprises an encapsulated ballmount assembly which is disposed between the annular flange member 78 formed on the cover or casing 31 of motor 22 and central annular portion 34 of mounting bracket 26. A plurality of ridges 79 and grooves 80 are provided in the surface of the flange member 78 to facilitate connection of the flange member to the inner race 81 of the encapsulated ballmount assembly. The inner race of the ballmount is affixed to the flange member 78 so that there is no relative movement therebetween.

Provided between the inner race 81 and the outer race 82 of the ballmount are a plurality of balls 84. Concentrically disposed about the outer race 82 of the ballmount is an annular ring 85 of resilient or flexible material, as for example, rubber.

Annular steel shells or rings 86 and 87 are pressed about the rubber ring so as to embrace the ring 85 from all sides. The rings comprise means for retaining and compressing the flexible material of the ring 85. Suitable lock pins 88 extend through openings 90 in the annular portion 34 of the mounting bracket 32 into the encapsulated ballmount assembly for securing the ballmount assembly in position in the mounting bracket 32.

The ballmount of the present invention may be utilized at both ends of the motor. In such case, it would be necessary to provide means for preventing rotation of the motor in the ballmounts. The limiting means can be conveniently incorporated into the ballmount structure.

The motor mounting means of the present invention prevents radial and axial movements of the motor and thereby prolongs seal life. The metallic ballmount prevents any torsional vibration transmission to the pump and the rubber ring 85 around the metallic ballmount reduces the transmission of sounds from the motor to the pump. The shells 86 and 87 encapsulate the ring 85 on all sides and thus produce a stiff mounting arrangement, both in the axial and radial directions, for the flexible material comprising the ring 85 is compressed to such a degree that further compression or deflection thereof cannot take place. As radial movement of the motor within the mounting therefor has been substantially obviated, the present invention has been found capable of withstanding severe jolts during shipment without resulting in damage to the components and leakage of the pump in operation.

Comparison tests have shown that a liquid circulator having the motor mounting arrangement of the present invention is materially more quiet than comparable liquid circulators utilizing a motor mounted in relatively hard resilient rubber rings of about 55 durometers hardness. In one set of comparison tests, competitive liquid circulators having vibrations at a frequency between 20 and 75 cycles per second created a noise level as high as 62 decibels, whereas the noise level of a circulator embodying the present invention was 48.5 decibels. At a frequency of vibrations between 75 and 150 cycles per second, competitive circulators caused a noise level as high as 64 decibels as compared with 54 decibels for the disclosed liquid circulator. At a frequency of vibrations between 150 and 300 cycles per second competitive circulators attained a noise level as high as 63 decibels whereas the circulator embodying the present invention attained a noise level of about 50.5 decibels.

From the foregoing, it is seen that over the noisiest portion of the operating range, the noise level of the liquid circulator of the present invention is substantially lower than the noise level of comparable circulators utilizing hard resilient rubber rings for mounting the motor. It should be noted that a reduction in noise of the magnitude of 10 decibels is substantial and represents a reduction in kind rather than degree, for the decibel is an exponential function.

The noise level of a liquid circulator utilizing the encapsulated ballmount assembly of the present invention is little more than that of a circulator having a motor mounted in relatively soft rubber rings of about 35 durometers hardness. However, as aforenoted, the durability and life of the seal of the liquid circulator having the motor mounted in a ballmount assembly is much improved over the liquid circulator having the motor mounted in only relatively soft rubber rings. Thus the present invention provides a motor mounting arrangement for a liquid circulator which is relatively quiet and which is stable so as to maximize the life of the seal means in the liquid circulator.

Another advantage of the present invention is that the rubber ring is prevented from aging prematurely due to the encapsulation thereof. Aging of rubber is caused largely by exposure of the rubber to oxygen. As only a very small area of the rubber ring is exposed to the air, aging of the rubber ring in the novel motor mounting means will be considerably delayed.

The shell means surrounding and enclosing the resilient ring are spaced from the outer race 82 of the ballmount so that no sound will be transmitted through the mounting means of this invention.

There has been provided an encapsulated ballmount arrangement for a motor in a liquid circulator which will retain the motor against radial and axial movement and which will minimize the sounds emanating from the motor. Sound and vibration of the motor are effectively isolated from the support for the motor. The liquid circulator having the improved mounting means of this invention is better able to withstand rough handling during shipment.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. A liquid circulator comprising, in combination: a vaned impeller having means adapted to be coupled to a rotating shaft, an electric motor of the type having opposite ends of a rotor-mounting drive shaft extending therefrom, one end of the drive shaft being close-coupled directly to said vaned impeller, and motor mounting means disposed between the vaned impeller and the motor for confining movement of the motor in both axial and radial directions and for minimizing sound and vibration emanating from said motor, said motor mounting means comprising a ballmount assembly affixed to the housing of the motor; an annular ring formed of resilient, compressible material surrounding and engaging said ballmount assembly; and shell means spaced from the ballmount and engaging said annular resilient ring for retaining the annular ring of resilient material in a compressed state while isolating the ballmount from direct contact with the shell means.

2. A liquid circulator comprising, in combination: a pump including a vaned impeller having means adapted to be coupled to a rotating shaft; an electric motor of the type having opposite ends of a rotor-mounting drive shaft extending therefrom; one end of the motor drive shaft being close-coupled directly to said vaned impeller; first motor mounting means disposed between the pump and the motor; and second motor mounting means disposed at the opposite end of the motor; said first motor mounting means comprising a ballmount arrangement affixed to said motor, a resilient ring formed of compressible material surrounding and engaging said ballmount arrangement, and shell means spaced from the ballmount and engaging said resilient ring for retaining the resilient ring in an incompressible condition, thereby confining movement of the motor in both axial and radial directions and isolating sound and vibration of the motor.

3. A liquid circulator comprising, in combination: a pump including a vaned impeller having means adapted to be coupled to a rotating shaft; an electric motor of the type having opposite ends of a rotor-mounting drive shaft extending therefrom; one end of the motor drive shaft being close-coupled directly to said vaned impeller; first motor mounting means disposed between the pump and the motor; and second motor mounting means disposed at the opposite end of the motor; said first motor mounting means comprising a ballmount arrangement affixed to said motor, a resilient ring formed of compressible material surrounding and engaging said ballmount arrangement, and shell means comprising a pair of annular rings, each L-shaped in cross-section, spaced from the ballmount and engaging said resilient ring for compressing and retaining the resilient ring in a substantially incompressible condition and for isolating the ballmount from direct contact with the shell means.

4. A liquid circulator comprising, in combination: a pump including a vaned impeller having means adapted to be coupled to a rotating shaft; an electric motor of the type having opposite ends of a rotor-mounting drive shaft extending therefrom; one end of the motor drive shaft being close-coupled directly to said vaned impeller; first motor mounting means disposed between the pump and the motor; and second motor mounting means disposed at the opposite end of the motor; said first motor mounting means comprising a ballmount arrangement affixed to said motor, an annular rubber ring surrounding and engaging said ballmount arrangement, and shell means spaced from the ballmount and engaging said rubber ring for retaining the rubber ring in an incompressible condition, thereby confining movement of the motor in both axial and radial directions and isolating sound and vibration of the motor.

References Cited by the Examiner

UNITED STATES PATENTS

| | | | |
|---|---|---|---|
| 1,639,684 | 8/27 | Bott | 103—87 |
| 2,686,630 | 8/54 | Burrowes | 230—232 X |
| 2,885,142 | 5/59 | Eberhart | 230—232 X |
| 2,928,961 | 3/60 | Morrill | 103—87 |

LAURENCE V. EFNER, *Primary Examiner.*

ROBERT M. WALKER, *Examiner.*